Patented Sept. 3, 1946

2,407,167

UNITED STATES PATENT OFFICE 2,407,167

DERIVATIVES OF 1-HYDROXYPHENYL-3-AMINOBUTANE AND PROCESSES FOR THEIR PRODUCTION

Fritz Külz, Frankfort-on-the-Main, Germany; vested in the Alien Property Custodian No Drawing. Application October 18, 1941, Serial No. 415,519½. In Germany February 21, 1940

3 Claims. (Cl. 260—570.8)

The invention concerns new derivatives of 1-hydroxyphenyl-3-aminobutane and processes for their production.

It is known that β-(p-hydroxyphenyl)-isopropylamine and its derivatives are characterized by a special effect on circulation.

Mannich has prepared the next higher homologue amine, the 1-hydroxyphenyl-3-aminobutane, from p-hydroxybenzylacetone, by preparing and reducing the oxim. (Archiv für Pharmazie, vol. 265, (1927), p. 23). It has been stated that this compound in comparison with the above named compound has a less distinct effect on circulation, while analgesic properties may be just detectable, but are far too weak to be suited for practical purposes.

It has been found that alike the known nor-base derivatives of 1-o, -p- or -m-hydroxyphenyl-3-aminobutane of the general formula

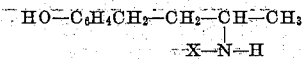

in which X represents alkyl, alkenyl, cyclo alkyl, cyclo alkenyl, aralkyl or aralkenyl have no ability of effecting circulation, but unlike the known nor-base have excellent analgesic properties. Among the alkyl derivatives, for example among the methyl-, ethyl-, propyl-, butyl-, isobutyl-, amyl-, isoamyl- derivatives the methyl derivative has strong, the butyl derivative extraordinary efficacious analgesic properties. The other alkyl derivatives have less outspoken analgesic properties. Compounds with an alkyl with more than 6 carbon atoms are less important for practical purposes. This rule is valid, independently of the position of the OH-group, that is whether it is in the o-, p- or m-position. Also alkenyl-, for example allyl-, cyclo alkyl-, for example cyclo pentyl- or cyclo hexyl, cyclo alkenyl, for example cyclo pentenyl or cyclo hexenyl, aralkyl-, for example benzyl-, phenyl ethyl-, or aralkenyl-, for example phenyl allyl-derivatives, have good analgesic properties.

The new analgesics may be prepared according to various methods. 1-hydroxyphenyl-3-aminobutane may be treated in known manner with agents, which are suited for introduction of the desired hydrocarbon residue, for example with halogenides of the corresponding hydrocarbons, or with corresponding aldehydes or ketones, in which latter case the forming Schiff's base must be hydrogenated, or according to Leuckart-Wallach.

One may, however, proceed vice versa, that is from 1-hydroxyphenyl-3-halogenbutane, and react this with a primary amine.

The new compounds may also be obtained by starting from hydroxybenzyl-acetone, condensing same with a primary amine or ammonia and hydrogenating the forming condensation products. If ammonia is used, the obtained 1-hydroxyphenyl-3-aminobutane must be treated with agents, which are suitable for introduction of the hydrocarbon residue.

The most simple method of producing the compounds according to the invention consists in condensing hydroxybenzalacetone with primary amines or ammonia. Also in this case condensation products are obtained, the carbon carbon double bond and the carbon nitrogen double bond of which may be hydrogenated in a single working process, for example catalytically by hydrogen in the presence of platinum. If ammonia is employed for the production of the condensation products the forming 1-hydroxyphenyl-3-aminobutane must be treated again with agents, which are suitable for introduction of the desired hydrocarbon residue.

The compounds according to the invention may also be prepared from 1-phenyl-3-aminobutanes substituted accordingly at the nitrogen by alkyl, alkenyl, cyclo alkyl, cyclo alkenyl, aralkyl or aralkenyl by nitration in the benzene ring, reduction of the obtained nitro compound to the amino compound, diazotizing of the amino group at the benzene ring with nitrous acid and converting into the desired hydroxy compounds by boiling.

Finally the analgesics according to the invention may be prepared from the corresponding alkoxy compounds by splitting off the etherified oxy group, for example by treatment with hydrohalogenic acid, especially hydrobromic acid. Further on they are obtained by saponification of the compounds acylated at the oxygen and/or the nitrogen.

EXAMPLES (1) *Preparation of 1-(p-hydroxyphenyl)-3-allylamino-butane*

2.0 grs. of allyl bromide are added to a hot benzene solution of 5.0 grs. of 1-(p-hydroxyphenyl)-3-amino-butane, prepared according to Mannich and Merz, Arch. Pharm., vol. 265, p. 15 (1927). The mixture is boiled for two hours under reflux. The crystallized hydrobromide of the starting amine is filtered with suction. The mother liquor is concentrated, if necessary filtrated again from a small quantity of non-converted starting base and evaporated to dryness. The 1-(p-hydroxyphenyl)-3-allylamino-butane, which is obtained in almost quantitative yield, is converted with ethereal hydrobromic acid into the hydrobromide, which, after re-crystallization from acetone, melts at 116–118° C. (uncorrected).

(2) Preparation of 1-(p-hydroxyphenyl)-3-cyclopentyl-amino-butane 5.0 grs. of 1-(p-hydroxyphenyl)-3-aminobutane and 2.8 grs. of cyclo pentanone in methanol with 0.3 gr. of platinum oxide are shaken in an atmosphere of hydrogen. An amount of hydrogen calculated for 1 mol. substance being taken up in the course of about 2 hours, the substance is filtrated from the catalyst. The methanol is evaporated and the residue taken up in ether. The 1-(p-hydroxyphenyl)-3-cyclopentylaminobutane is precipitated with ethereal hydrobromic acid. It melts after re-crystallization from acetone at 173 to 174° C.

(3) Preparation of 1-(p-hydroxyphenyl)-3-allylaminobutane 1-(p-hydroxyphenyl)-3-brom-butane is prepared by heating a mixture of 5.0 grs. of 1-(p-hydroxyphenyl)-3-oxy-butane, obtained according to Mannich and Merz, Arch. Pharm., vol. 265, p. 22 (1927) and hydrogen bromide in glacial acetic acid for 3 hours to 100° C. After the glacial acetic acid has been distilled off in vacuo the obtained substance is purified by taking up in ether, shaking of the ethereal solution with a solution of bicarbonate, drying and evaporation of the ether. This starting material is heated to 120–130° C. with allyl amine in great excess in a bomb tube for five hours. The excess allyl amine is evaporated. The residue is taken up in diluted hydrochloric acid, and, in order to remove neutral bodies, extracted with ether. The acid solution is rendered alkaline by help of bicarbonate. The obtained base is taken up in ether. The ether is evaporated. The residue, after having been distilled in high vacuo (boiling point 145–150° C. under 0.05 mm. pressure) is converted into the hydrobromide, which melts after re-crystallization from acetone at 116–118° C. Adding on hydrobromide of same constitution prepared according to Example 1 there is no depression of the melting point to be observed.

(4) Preparation of 1-(p-hydroxyphenyl)-3-methylamino-butane 5.0 grs. of p-hydroxybenzyl-acetone are shaken with 0.95 gr. of methylamine, solved in absolute alcohol in the presence of platinum black in an atmosphere of hydrogen. An amount of hydrogen being taken up which corresponds to 1 mol. substance the substance is worked up according to Example 2. The hydrobromide of the 1-(p-hydroxyphenyl)-3-methylamino-butane melts after re-crystallization from water at 143° C.

(5) Preparation of 1-(p-hydroxyphenyl)-3-n-butylamino-butane 5.0 grs. of p-hydroxybenzylacetone and 2.3 grs. of n-butylamine solved in absolute alcohol are hydrogenated and worked up according to Example 4. The residue, after evaporation of the alcohol, is heated for some time in the water-bath under vacuo, in order to remove some remaining butylamine. The hydrobromide of the 1-(p-hydroxyphenyl)-3-n-butylamino-butane melts after recrystallization from water at 170° C.

(6) Preparation of 1-(p-hydroxyphenyl)-3-benzylamino-butane 5.0 grs. of p-hydroxybenzylacetone are hydrogenated with a solution of 3.3 grs. of benzylamine in absolute alcohol according to Example 4 and are worked up according to Example 5. The hydrobromide of the 1-(p-hydroxyphenyl)-3-benzylamino-butane melts after re-crystallization from water at 158° C.

(7) Preparation of 1-(o-hydroxyphenyl)-3-n-butylamino-butane 8.1 grs. of o-hydroxybenzal-acetone are treated with a solution of 3.7 grs. of n-butylamine. The red solution is shaken with platinum black in an atmosphere of hydrogen. 2 moles of hydrogen being taken up hydrogenation comes to a standstill. The solution, now practically colorless, is filtered from the catalyst, acidified with diluted hydrochloric acid and evaporated to dryness. The residue is crystallized from acetone after a small quantity of methanol is added. The hydrochloride of the 1-(o-hydroxyphenyl)-3-n-butyltane melts at 143° C.

(8) Preparation of 1-(o-hydroxyphenyl)-3-n-propylamino-butane 8.1 grs. of o-hydroxybenzal-acetone was treated with 3.0 grs. of n-propylamine and worked up as described in Example 7. The hydrochloride of the 1-(o-hydroxyphenyl)-3-n-propylamino-butane melts at 143° C.

(9) Preparation of 1-(m-hydroxyphenyl)-3-n-butylamino-butane 8.1 grs. of m-hydroxybenzal-acetone are treated with butylamine and worked up as described in Example 7, a difference only consisting in not using diluted hydrochloric acid but diluted hydrobromic acid for acidification. The hydrobromide of the 1-(m-hydroxyphenyl)-3-n-butylamino-butane melts at 117° C.

(10) Preparation of 1-(p-hydroxyphenyl)-3-ethylamino-butane 8.1 grs. of p-hydroxybenzal-acetone are, according to Example 9, converted with 2.3 grs. of ethylamine and worked up. The hydrobromide of the 1-(p-hydroxyphenyl)-3-ethylamino-butane melts at 130° C.

(11) Preparation of 1-(p-hydroxyphenyl)-3-n-propyl-amino-butane 8.1 grs. of p-hydroxybenzal-acetone are converted with 3.0 grs. of n-propylamine and worked up according to Example 9. The hydrobromide of the 1-(p-hydroxyphenyl)-3-n-propylamino-butane melts at 138° C.

(12) Preparation of 1-(p-hydroxyphenyl)-3-n-amylamino-butane 5.0 grs. of 1-(p-methoxyphenyl)-3-n-amylamino-butane obtained by catalytic hydrogenation of a mixture consisting of p-methoxybenzal-acetone and n-amylamine in alcohol and purified by distillation (boiling point 192/194° C. at 20 mm.) were heated to boiling under reflux with the ten-fold amount of constant boiling hydrobromic acid. After evaporation to dryness the residue is crystallized from water. The hydrobromide of the 1-(p-hydroxyphenyl)-3-n-amylamino-butane melts at 125° C.

Having now particularly described and ascertained the nature of my said invention and in what manner it is to be performed I declare that what I claim is:
1. 1-(o-hydroxyphenyl)-3-n-butylamino-butane of the formula
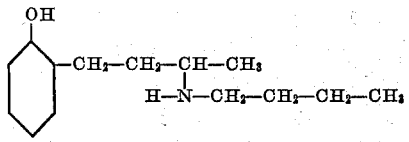
2. 1-(p-hydroxyphenyl)-3-n-butylamino-butane of the formula
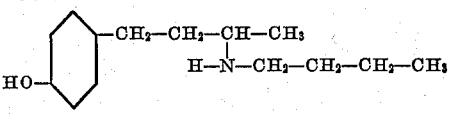
3. A substituted butylamino-butane of the formula
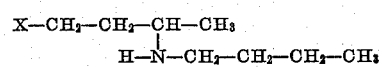
in which X is a hydroxyphenyl radical.
FRITZ KÜLZ.